Feb. 25, 1964 T. T. KUBIT 3,122,057
MEANS FOR LAUNCHING SPACE VEHICLES
Filed Feb. 17, 1961 4 Sheets-Sheet 1

INVENTOR.
T. T. Kubit
BY Robb & Robb
Attorneys

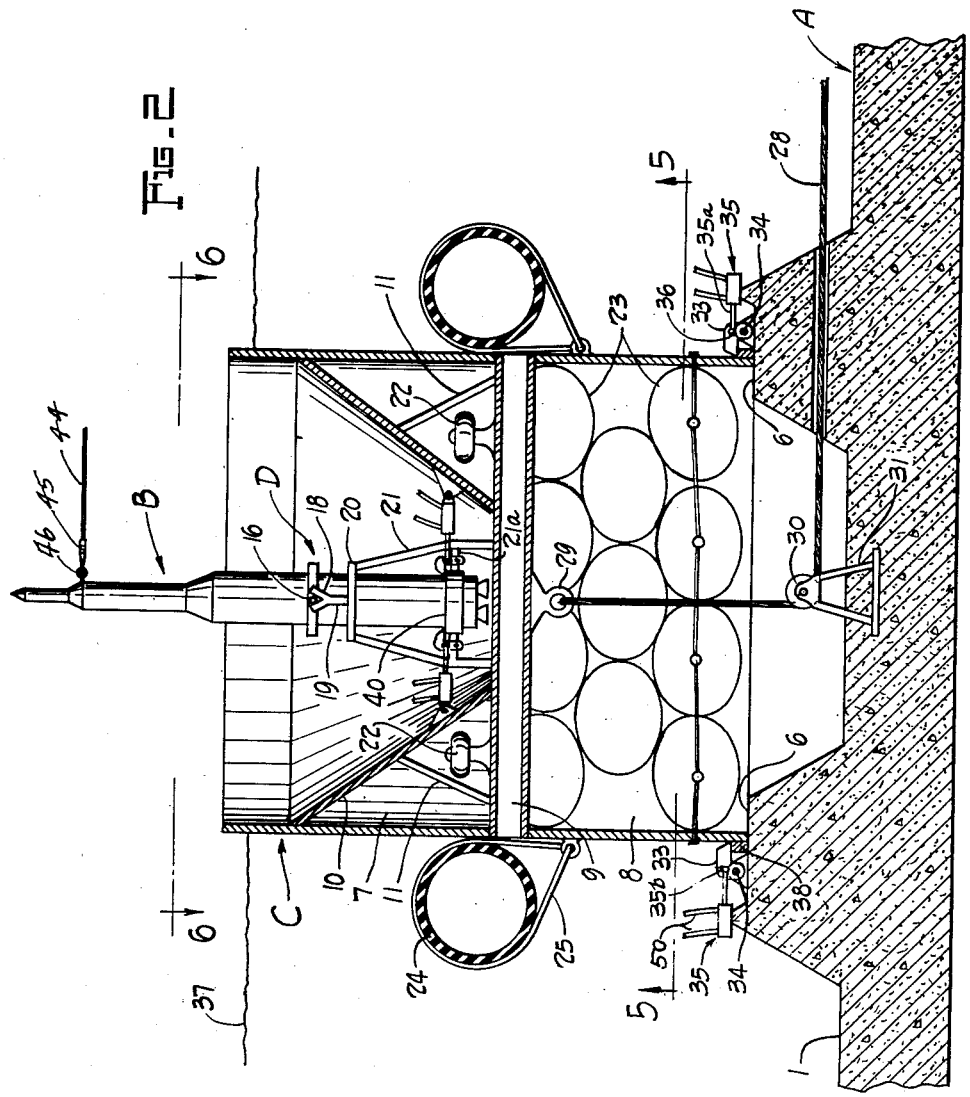

Feb. 25, 1964 T. T. KUBIT 3,122,057
MEANS FOR LAUNCHING SPACE VEHICLES
Filed Feb. 17, 1961 4 Sheets-Sheet 3

INVENTOR.
T. T. Kubit
BY Robb & Robb
Attorneys.

Feb. 25, 1964 T. T. KUBIT 3,122,057
MEANS FOR LAUNCHING SPACE VEHICLES
Filed Feb. 17, 1961 4 Sheets-Sheet 4

INVENTOR.
T. T. Kubit
BY Robb & Robb
Attorneys.

United States Patent Office
3,122,057
Patented Feb. 25, 1964

3,122,057
MEANS FOR LAUNCHING SPACE VEHICLES
Theofile T. Kubit, 3904 Archwood Ave., Cleveland, Ohio
Filed Feb. 17, 1961, Ser. No. 90,113
17 Claims. (Cl. 89—1.7)

My present invention appertains to the art of launching space vehicles, and particularly relates to such means designed especially for employment with such vehicles requiring extremely high thrust for launching as in the case of earth satellite and inter-planetary types as well as inter-continental ballistic missiles and the like vehicles carrying relatively heavy pay loads.

One of the most difficult problems associated with such vehicles carrying extremely heavy pay loads arises from the fact that the weight factor makes necessary the employment of engines capable of producing extremely high power or thrust of the order of half a million pounds and upward. At the present time engines capable of delivering such thrust must of necessity be relatively heavy and this correspondingly reduces the ratio of the effective pay load to the total weight of the vehicle including the heavy engines required to deliver the required power.

It is therefore a principal object of the present invention to provide launching means for such vehicles which will enable heavier pay loads to be carried by such vehicles with the desired upward thrust without increasing the total weight of such vehicles; or, to put the matter another way, the principal object of the present invention is to provide launching means for such vehicles which will enable the same to carry heavier pay loads with the desired upward thrust utilizing presently available engines.

A further object of the invention is to provide relatively inexpensive, efficient and practical earth bound launching means capable of providing substantial additional upward thrust to such vehicles at the time of launching without increasing the power of the engines carried by the vehicle or the weight thereof.

Another object of the invention is to provide relatively inexpensive, efficient and practical earth bound launching means capable of projecting the vehicle upwardly independently of the engines carried by the vehicle and thus increasing the effectiveness thereof at take-off whereby to provide additional upward thrust for the vehicle whereby to enable the latter to carry heavier pay loads without increasing the power of the engines carried thereby or the total weight thereof, or conversely, enabling the vehicle to carry heavier pay loads while utilizing engines carried by the vehicle of less power and weight than now required.

In carrying my present invention into practice I provide relatively simple, inexpensive, and practical earth bound means for assisting at take-off in the launching of the vehicle, the same, in one form, comprising a launching carrier which is buoyant or floatable in a body of liquid, means for maintaining said launching carrier partially submerged in said body of liquid, and means for releasing said latter means to effect upward movement of the launching carrier by the buoyancy effect thereof relative to said body of liquid resulting from the initially partially submerged condition of the carrier. My invention further contemplates the provision of various ancillary means for increasing the buoyancy of the launching carrier; means for causing the level of the body of liquid to rise when the launching carrier is released from partially submerged condition so as to increase the speed of upward movemnet thereof in addition to the effect of the buoyancy potential of the launching carrier and ancillary buoyancy increasing means; means for guiding the launching carrier in its upward movement; other means for maintaining balanced condition of the launching carrier in its upward movement; means for maintaining upright condition of the vehicle during upward movement of the launching carrier in the event of unbalanced movement of the latter.

Other objects, advantages and features of the invention will become apparent upon reference to the following detailed description, taken in conjunction with the accompanying drawings in which:

FIGURE 2 is a vertical sectional view through the launching carrier and its base, showing a multi-stage space vehicle mounted in place on the carrier.

Figure 1:
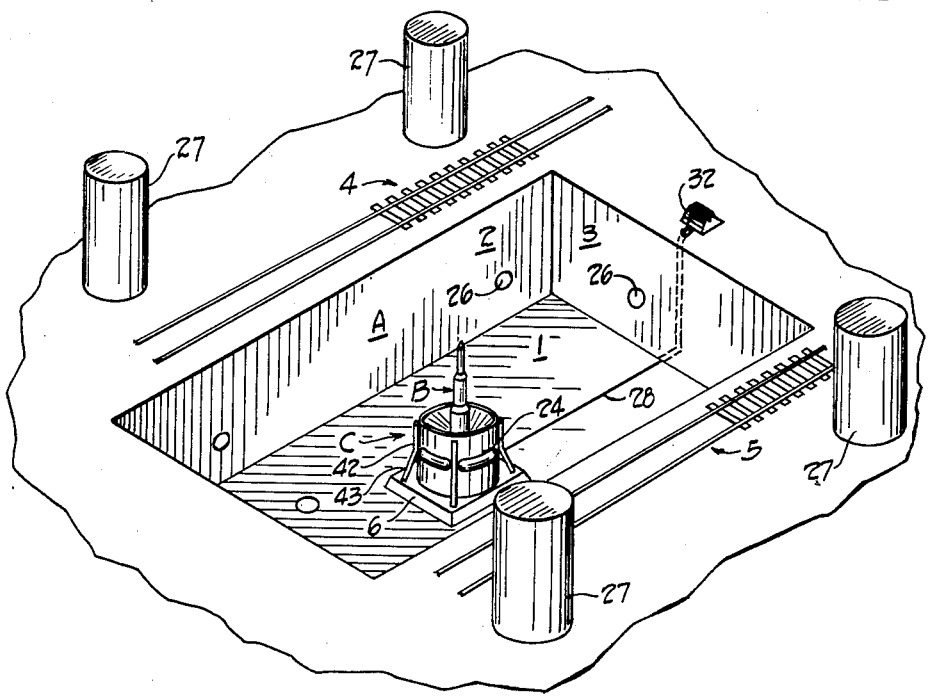
FIGURE 1 is a perspective view of launching means embodying my invention.

Now referring to the drawings and describing the invention in detail, FIGURE 1 discloses launching means of my invention comprising a dry dock consisting of a pit generally designated by the letter A for containing a body of water of suitable depth. The bottom 1 and side walls 2 and 3 as well as the surrounding surface approaches to the pit A may suitably be constructed of reinforced concrete. On the surface approaches above and at opposite sides of the pit A, railroad tracks 4 and 5 may be laid on which suitable cranes may run for transporting and lowering the space vehicle generally designated by the letter B into place on the launching carrier generally designated by the letter C.

The said launching carrier C is designed to rest on a rest pad 6 raised from and located approximately centrally of the bottom 1 of the pit. The carrier C comprises an upper tank 7 and a lower tank 8 between which a horizontal tube 9 extends from side to side of the carrier and open at each end to provide a liquid cooling chamber through which liquid in the pit 1 may circulate for assisting in dissipation of heat produced by the exhaust gases from the engines of the space vehicle B disposed in the upper tank 7 of the carrier C. The upper tank 7 is of course open at its upper end to permit the vehicle B disposed therein to extend upwardly therefrom. The lower tank 8 is preferably open at its lower end as shown. The upper tank 7 is provided with a cone-shaped exhaust deflector 10 with the narrow portion at the bottom of the upper tank 7 and designed to surround the base of the vehicle B when the latter is in place as shown in FIGURES 1 and 2. Suitable lateral bracing indicated by the numeral 11 may be provided for rigidifying the deflector 10 relative to the upper tank portion 7 of the carrier C.

A suitable gimbal mounting generally designated by the letter D may be provided for supporting the vehicle B in launching position within the upper tank 7 of the carrier C. The said gimbal mounting, as shown, comprises an inner ring 12 which is pivotally connected by means of pivots or trunnions 13 and 14 about one diametrical axis to an outer ring 15 provided with pivots or trunnions 16 and 17 receivable in yokes 18 provided at the upper ends of the arms 19 extending upwardly from and secured at their lower ends to a supporting ring 20 carried by supporting legs 21. The pivots 16 and 17 provide a diametrical pivotal axis for the outer ring 15 which is at right angles to the diametrical pivotal axis of the inner ring 12 around the pivots 13 and 14. The inner ring 12 is integral with the vehicle B and preferably may form a part of the first or lower stage thereof which can drop off during the course of the flight of the vehicle.

In any event the pivotal axis of the inner ring 12 relative to the outer ring 15 will be located at or above the center of gravity of the vehicle B. Thus the vehicle B and inner ring 12 are pivotally movable with respect to the outer ring 15 and when the latter is pivotally supported in the yokes 18 of the arms 19 the vehicle B will automatically align itself on a vertical axis which alignment will be maintained despite mis-aligning movement of the carrier C.

Gyroscopes 22 may be mounted on the carrier for the purpose of stabilizing the carrier during its upward movement for launching of the vehicle B.

The lower tank 8 may be sealed at its lower end and filled with a suitable gas to provide additional buoyancy for the carrier C relative to the body of liquid in which the carrier is to be partially submerged in use. Preferably however the lower tank 8 will be open at its lower end as shown and a plurality of rubber balloons or balls 23 may be placed therein prior to submerging the carrier C in the liquid in the pit A, the said balls or balloons 23 providing additional buoyancy for the carrier C when the latter is partially submerged in the liquid in the pit A in the manner hereinafter described, and being secured to the carrier.

Also for the purpose of providing additional buoyancy for the carrier C, sausage type tubes 24 inflated with air or other suitable gas may be secured to the outside of the carrier C by means of the encircling bands 25.

A suitable number of water supply inlets 26 will be provided in the walls of the pit A, and said inlets will be of a suitable size to permit rapid filling of the pit A with water from a suitable source of supply. Storage tanks 27 for containing a reserve supply of water for the pit A may be located on the surface approaches above the pit and connected to inlets 26.

Suitable hold down means are provided for retaining the carrier C in position with its lower end resting on the rest pad 6 for maintaining the said carrier C partially submerged in the body of liquid in the pit A until it is desired to release the carrier from such conduction for upward movement thereof by the buoyancy effect thereof relative to said body of liquid. Such hold down means may include the cable 28 one end of which is secured to a ring bracket 29 attached to the carrier C. The cable 28 is reeved over a suitable pulley 30 pivotally carried by a suitable bracket 31 secured to the bottom of the pit A. The other end of the cable 28 will be secured to the drum of a suitable winch generally designated by the numeral 32 and disposed at any convenient location, the said cable being reeved around other intermediate pulleys as may be required.

Additional locking hold down means may be provided for cooperation with the carrier C to maintain the same in the position shown in FIGURE 2. Said additional hold down locking means may comprise the pivoted locking dogs 33 pivotally connected as at 34 to suitable brackets attached to the pad 6. The locking dogs 33 are pivotally movable to positions engaging the upper edge of a ring 38 secured to the lower part of the carrier C, as shown in FIGURE 2. Suitable means for effecting locking and unlocking of the members 33 may be provided and such means may comprise suitable hydraulic or pneumatic piston and cylinder means generally designated by the numeral 35 and having their piston members 35a respectively pivotally connected as at 35b to the locking dogs 36, and supplied through flexible hoses 50.

In the use of the launching means of my invention, the carrier C will be retained in its position with the lower end resting on the pad 6 by the hold down means previously referred to and the level of liquid in the pit A will be adjusted to a level approximating that indicated by the numeral 37 just below the upper end of the carrier C so that the latter will be substantially entirely submerged in the liquid in the pit A with the level of liquid in the latter being such that it will not overflow into the upper tank 7. With the carrier C disposed as just described and partially submerged in the body of liquid in the pit A, the space vehicle B will be disposed within the upper tank 7 of the carrier C as shown in FIGURE 2, with the trunnions 16 and 17 received in the yokes 18. The vehicle B will be retained in such a position by suitable hold down means 21a similar to the hold down means 33–35 previously described. A ring 40 secured to the lower end of the vehicle B may be provided for cooperation with such hold down means for retaining the vehicle B in position on the carrier C. The vehicle B may be emplaced in position on the carrier C by means of suitable cranes operating on the track ways 4 and 5, as previously mentioned.

When the vehicle B is ready to be launched, the engines carried thereby will be started while the hold down means cooperable with the ring 40 retains the vehicle B in the position of FIGURE 2. After the engines carried by vehicle B have been started and are functioning properly, the hold down means for the carrier C will be released thereby permitting the carrier C to float upwardly by virtue of the buoyancy potential thereof due to its artificially submerged condition in the body of liquid in the pit A, as shown in FIGURE 2. As before mentioned the carrier C will be designed, when carrying the vehicle B, to float much higher in the body of liquid than the position of the carrier C in its artificially submerged condition of FIGURE 2 so that a very substantial upward lifting force is created by the buoyancy potential of the carrier C in its artificially submerged condition of FIGURE 2, said lifting force acting to move the carrier C upwardly independently of the engines of vehicle B when the hold down means for the carrier C are released.

During such upward movement of the carrier C from the artificially submerged condition of FIGURE 2, after the hold down means for the carrier C are released, the cable 28 will of course unwind from the drum of the winch 32. The carrier C will be guided in its upward movement from the position of FIGURE 2 by suitable guiding means comprising guide rails 41 secured to the carrier C and extending vertically thereof, said guide rails running in the channel guides 42 secured to the rest pad 6 by means of suitable lateral braces 43. The guide means 41—42 and the gyroscope stabilizers 22 will serve to guide and stabilize the carrier C in its upward movement from the artificially submerged condition of FIGURE 2. The gimbal mounting of the vehicle B relative to the carrier C will also serve to stabilize the vehicle B in upright or vertical position as shown in FIGURE 2 during upward movement of the carrier C from that position.

Immediately after release of the carrier C from its artificially submerged condition of FIGURE 2, when the carrier C is moving upwardly in the body of liquid due to the buoyancy potential of its artificially submerged condition, the hold down means for the vehicle B may then be released for launching of the vehicle B whose engines are already operating at full launching thrust.

Thus, in the use of the launching means of this invention, the carrier C will already be moving upwardly at the time when the vehicle B is released from the carrier C for movement of the vehicle B upwardly under the power of its own engines. Prior to release of the vehicle B from the carrier C, as soon as the carrier C starts to move upwardly due to its buoyancy potential, the valves controlling the inlets 26 will be opened to permit liquid from the supply tanks 27 to enter the pit A rapidly and in sufficient quantity to replace the liquid displaced by the carrier C in submerged condition and this will further assist the upward movement of the carrier C during the launching process.

It will be appreciated that various means have been provided for stabilizing the vehicle B during upward movement of the carrier C, including the means for guiding the carrier in its upward movement, the provision of the stabilizing gyroscopes 22, and the gimbal mounting D for the vehicle B. Additionally, there may be utilized a safety cable 44 attached by means of a fracturable connection 45 to a ring or other securing means 46 secured to the upper part of the vehicle B. The cable 44 may be attached to a crane boom from a point above the vehicle B and the cable may remain attached to the vehicle B for a short interval immediately after launching or until the ground control crew is reasonably assured that successful launching is being effected whereupon the cable 44 will be released from the vehicle B. For this purpose an explosive charge may be provided within the fracturable connection 45 and this explosive charge may be set off electrically from the ground by electric current carried along the cable 44 to the explosive charge in the fracturable connection 45, the explosion of the charge in said connection serving to sever the cable 44 from the vehicle B.

In order to appreciate the advantages of the launching means of the invention, it may be pointed out that a very considerable amount of power is necessary to be provided merely to start upward movement of the vehicle B from its initial stationary condition and that if this initial starting force has to be provided by the engines contained in the vehicle B itself this entails providing more powerful engines adding considerably to the weight of the vehicle and requiring still more power merely for the moving upwardly or lifting of the added weight of such engines. It will be realized, therefore, that if the vehicle B can be placed in upward motion without utilizing power from the self-contained engines of the vehicle, the power requirements of the vehicle's self-contained engines will be greatly reduced and thereby the weight of the engines and the total weight of the vehicle may be greatly reduced while at the same time providing the necessary power for the required speed of upward movement of the vehicle B. Conversely, the use of the launching means of the invention will enable greater pay loads to be carried by vehicles having engines of a given power.

It will be understood that if the vehicle B should be subject to malfunction immediately after its release from the carrier C, it may still be saved from destruction at least with respect to the upper stage connected to the cable 44 by retention of connection of the cable thereto while effecting disconnection of the upper stage from the remainder of the vehicle.

A further safety factor is provided by the launching means of the invention in that if the vehicle B should malfunction after its engines are started and before the vehicle is released from the carrier C, the winch 32 can be stopped or if necessary reversed so that by virtue of the connection of the cable 28 to the carrier C the latter can be retained in partially submerged condition or further submerged and the water level in the pit A can be rapidly raised to overflow into the upper tank 7 so as to flood the engines of the vehicle B and thereby stop the same so as to avoid a disaster which might otherwise occur.

Figures 3, 4:
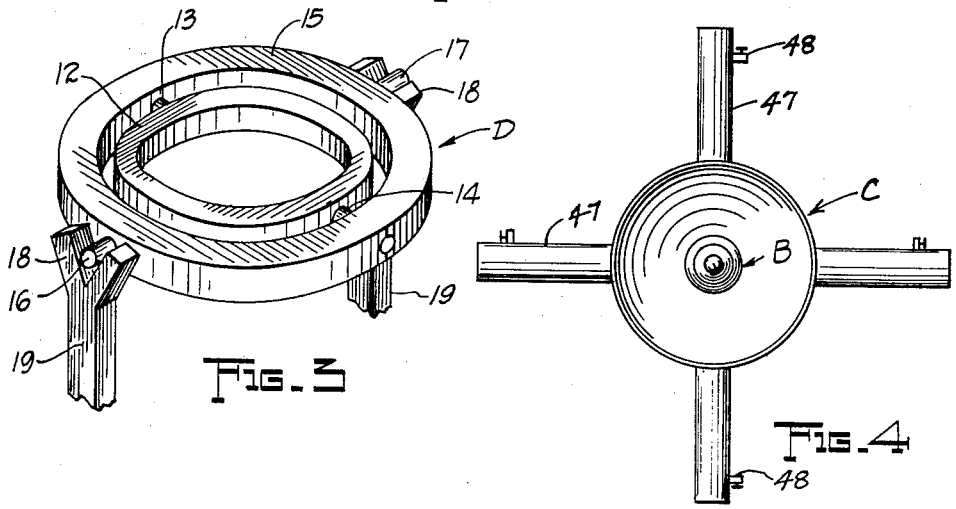
FIGURE 3 is a perspective view showing the gimbal mounting for supporting the space vehicle on the launching carrier.
FIGURE 4 is a top plan view of the carrier showing a modification in reference to the auxiliary means for increasing buoyancy of the carrier.
Figure 5:
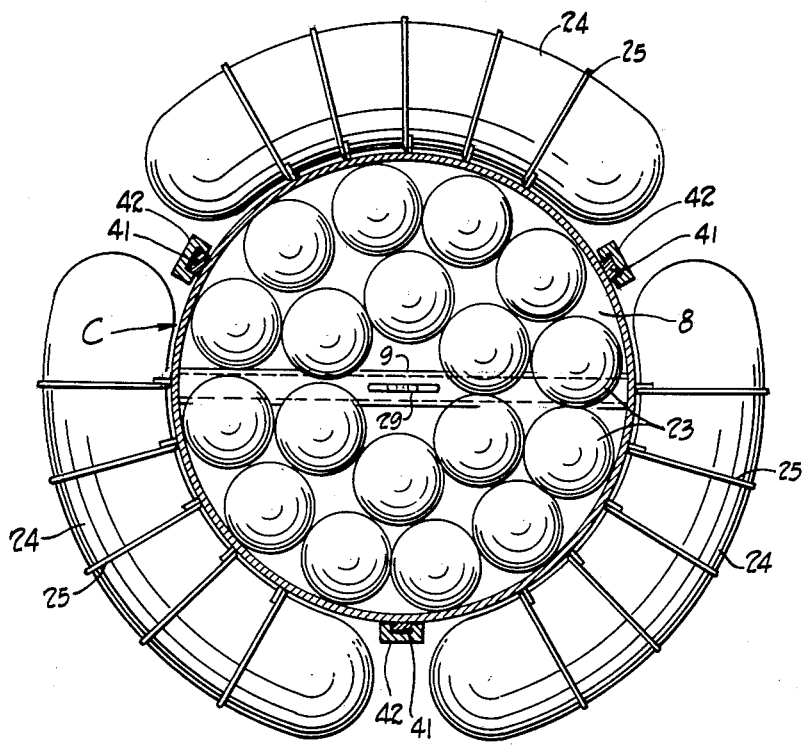
FIGURE 5 is a sectional view taken substantially on the line 5—5 of FIGURE 2.
Figure 8:
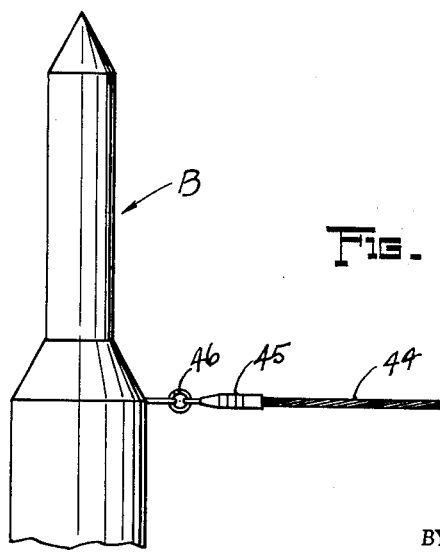
FIGURE 8 is an enlarged detail view of a portion of the vehicle B, showing more particularly the safety release means for the vehicle rescue cable.
Figure 6:
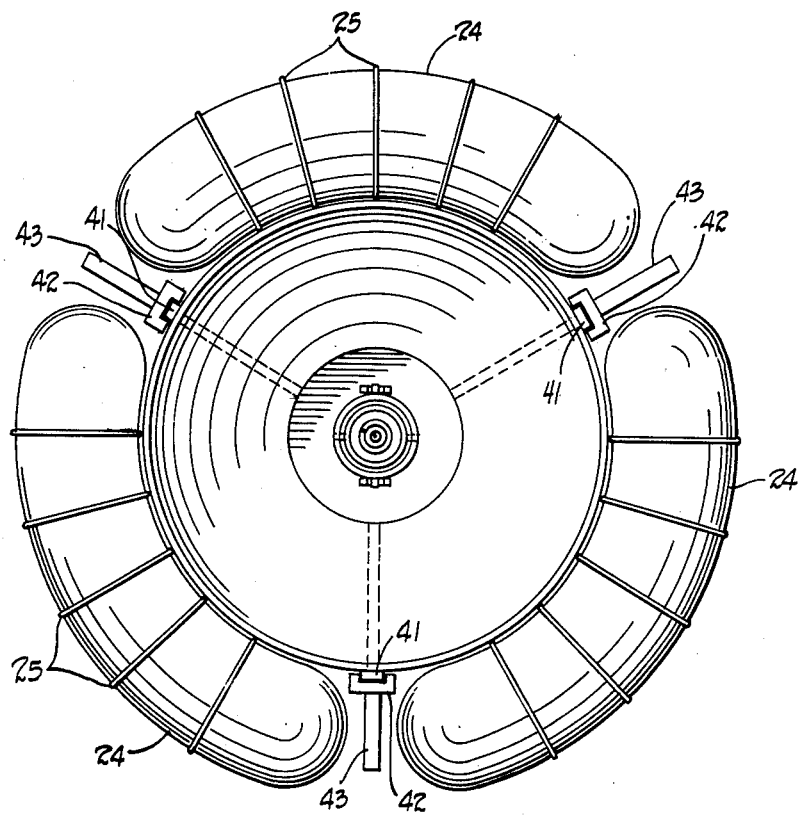
FIGURE 6 is a top plan view of the launching carrier of FIGURE 2.
Figure 7:
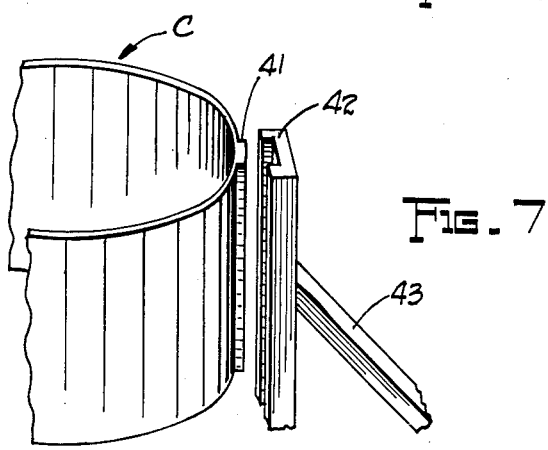
FIGURE 7 is a detail perspective view of a portion of the carrier C showing more particularly the construction of guide means.

FIGURE 4 shows a modification in reference to the auxiliary means for increasing buoyancy of the carrier. Instead of the tubes 24, there may be rigidly secured to the carrier C a plurality of sealed tanks 47 which may be gas filled through the valves 48.

I claim:

1. Launching means of the class described comprising, in combination, a liquid container, a body of liquid in said container, a buoyant carrier communicating with the atmosphere and excluding water therefrom for carrying a space vehicle, hold-down means on said carrier for securing said vehicle to said carrier with the vehicle engines running, retaining means for securing said carrier to said container to retain said carrier partially submerged in a body of liquid in said container with the upper portion of said carrier above the surface of said liquid body to provide a buoyancy force acting to move the carrier in said body of liquid in the direction in which the vehicle is to be launched upon release of said retaining means, and means for releasing said retaining means for upward movement of said carrier in said direction in said body of liquid due to the buoyancy of said carrier, said hold-down means being operable to release said vehicle from said carrier during movement of the latter in said direction.

2. Launching means as in claim 1, combined with liquid supply means for rapidly supplying liquid to said container.

3. Launching means of the class described comprising, in combination, a buoyant vehicle carrier communicating with the atmosphere and excluding water therefrom for carrying a space vehicle, hold-down means on said carrier for securing such vehicle to said carrier with the vehicle engines running, earth connected retaining means for retaining said carrier at least partially submerged in a body of liquid with the upper portion of the carrier above the surface of said liquid body to provide a buoyancy force acting to move the carrier in said body of liquid in the direction in which said vehicle is to be launched upon release of said retaining means, means for releasing said retaining means for movement of said carrier in said direction in said body of liquid due to said buoyancy force while the vehicle engines are running, and means operable to release said hold-down means from said vehicle for launching the latter during movement of the carrier in said direction.

4. Launching means as in claim 3, combined with an auxiliary gas filled container secured to said carrier to increase the buoyancy of the latter.

5. Launching means as in claim 3, wherein the carrier comprises an upper tank for receiving said vehicle and a lower tank disposed beneath said upper tank and open at its bottom.

6. Launching means as in claim 3, combined with a tube extending transversely of the carrier and having its ends in communication with said body of liquid therethrough to dissipate heat of the exhaust gases from said vehicle.

7. Launching means as in claim 3, wherein the carrier comprises a tank for receiving said vehicle therewithin, and a conical deflector within said tank and surrounding the lower portion of said vehicle with the narrowest portion of the deflector adjacent the base of the vehicle.

8. Launching means as in claim 3, combined with gimbal mounting means on said carrier for mounting the vehicle thereon for vertical self-alignment of the vehicle.

9. Launching means as in claim 3, combined with detachable means for securing a portion of said vehicle to an earth secured cable.

10. Launching means as in claim 3, wherein the retaining means includes a cable secured to the lower part of the carrier, winch means for winding the cable, and earth connected cable guide means intermediate said carrier and said winch means and arranged to guide the cable so that winding of the cable by the winch will pull the carrier downwardly relative to the body of liquid in the container.

11. Launching means as in claim 3, combined with guide means for guiding the carrier in its upward movement in the body of liquid.

12. Launching means as in claim 3, combined with guide means for guiding the carrier in its upward movement in the body of liquid, a stabilizing gyroscope on said carrier, and gimbal mounting means on said carrier for vertical self-alignment of the vehicle.

13. Launching means as in claim 3, wherein the carrier comprises an upper tank for receiving said vehicle and a lower tank disposed beneath said upper tank and open at its bottom, combined with an auxiliary gas-filled container secured to said carrier to increase the buoyancy thereof.

14. Launching means as in claim 3, wherein the carrier comprises a tank open at its upper end for receiving said vehicle therewithin, and a conical deflector within said tank and surrounding the lower portion of said vehicle with the narrowest portion of the deflector adjacent the base of the vehicle, whereby to deflect the vehicle engine exhaust gases outwardly from the vehicle and upwardly from the upper open end of said tank, combined with a tube extending transversely of the carrier and having its ends in communication with said body of liquid therethrough to dissipate heat of the exhaust gases from said vehicle.

15. Launching means of the class described comprising, in combination, a liquid container, a body of liquid in said container, a buoyant carrier communicating with the atmosphere and excluding water therefrom for carrying a space vehicle, hold-down means on said carrier for securing said vehicle to said carrier with the vehicle engines running for launching said vehicle, retaining means for securing said carrier to said container to retain said carrier partially submerged in said body of liquid therein with the upper portion of said carrier above the surface of said liquid body to provide a buoyancy force acting to move the carrier in said body of liquid in the direction in which the vehicle is to be launched upon release of said retaining means, means for raising the liquid level in said container while said carrier is so partly submerged and buoyantly supported in the body of liquid in said container, means for releasing said retaining means for movement of said carrier in said direction in said body of liquid due to the buoyancy of said carrier, and means operable to release said hold down means from said vehicle for launching the latter during movement of the carrier in said direction.

16. Launching means as in claim 15 combined with earth connected retaining means for retaining said carrier at least partially submerged in the liquid in said container while the liquid level thereof is being raised.

17. The method of launching a space vehicle which comprises securing said vehicle to a buoyant vehicle carrier communicating with the atmosphere and excluding water therefrom for carrying a space vehicle, partially submerging said carrier in a body of liquid with the upper portion of said carrier above the surface of said liquid body, running the vehicle engines while the vehicle is so secured and while the carrier is in said partially submerged condition, then releasing said carrier from said partially submerged condition for movement of said carrier in the direction in which said vehicle is to be launched in said body of liquid due to the buoyancy of said carrier with the vehicle engines running and while said vehicle is secured to the carrier, and then finally releasing the vehicle from said carrier with the vehicle engines running and during upward movement of said carrier in said body of liquid.

References Cited in the file of this patent

UNITED STATES PATENTS

| 2,686,473 | Vogel | Aug. 17, 1954 |
| 2,813,486 | Goff | Nov. 19, 1957 |
| 2,925,013 | Santara et al. | Feb. 16, 1960 |
| 2,981,187 | Riordan et al. | Apr. 25, 1961 |
| 2,989,899 | Siegel et al. | June 27, 1961 |
| 3,014,410 | Anderson | Dec. 21, 1961 |

FOREIGN PATENTS

| 914,341 | France | June 17, 1946 |
| 1,110,465 | France | Oct. 12, 1955 |

OTHER REFERENCES

Aviation Week, vol. 73, No. 24, Dec. 12, 1960, Sea Launch Studied for Space Vehicles, pp. 69, 73, 75, 79.

Missiles and Rockets, January 1957, pp. 18 and 19, Break-up in Army-Navy Jupiter Program.